United States Patent
Liu

(10) Patent No.: US 8,861,593 B2
(45) Date of Patent: Oct. 14, 2014

(54) CONTEXT ADAPTATION WITHIN VIDEO CODING MODULES

(75) Inventor: Wei Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 642 days.

(21) Appl. No.: 13/048,089

(22) Filed: Mar. 15, 2011

(65) Prior Publication Data

US 2012/0236929 A1 Sep. 20, 2012

(51) Int. Cl.
| | |
|---|---|
| *H04N 19/00* | (2014.01) |
| *H04N 19/122* | (2014.01) |
| *H04N 19/51* | (2014.01) |
| *H04N 19/14* | (2014.01) |
| *H04N 19/129* | (2014.01) |
| *H04N 19/46* | (2014.01) |
| *H04N 19/11* | (2014.01) |
| *H04N 19/61* | (2014.01) |
| *H04N 19/85* | (2014.01) |
| *H04N 19/117* | (2014.01) |

(52) U.S. Cl.
CPC ... *H04N 19/00739* (2013.01); *H04N 19/00084* (2013.01); *H04N 19/00157* (2013.01); *H04N 19/00109* (2013.01); *H04N 19/00545* (2013.01); *H04N 19/00042* (2013.01); *H04N 19/00781* (2013.01); *H04N 19/00903* (2013.01); *H04N 19/00066* (2013.01)
USPC .................................. 375/240.02; 375/240.24

(58) Field of Classification Search
USPC ........ 375/240, 240.02, 240.24; 382/233, 131; 704/200
See application file for complete search history.

(56) References Cited

U.S. PATENT DOCUMENTS

| | | | | |
|---|---|---|---|---|
| 5,347,311 | A * | 9/1994 | Golin ...................... | 375/240.12 |
| 6,895,051 | B2 * | 5/2005 | Nieweglowski et al. | 375/240.03 |
| 7,277,587 | B2 | 10/2007 | Sun | |
| 7,602,851 | B2 * | 10/2009 | Lee et al. ................. | 375/240.25 |
| 8,046,214 | B2 * | 10/2011 | Mehrotra et al. ......... | 704/200.1 |
| 8,077,769 | B2 * | 12/2011 | Krishnan ...................... | 375/240 |
| 8,130,828 | B2 * | 3/2012 | Hsu et al. ................ | 375/240.03 |
| 8,265,136 | B2 * | 9/2012 | Hong et al. ................... | 375/240 |
| 8,422,546 | B2 * | 4/2013 | Lin et al. ...................... | 375/240 |
| 2005/0281337 | A1 * | 12/2005 | Kobayashi et al. ...... | 375/240.18 |
| 2007/0065028 | A1 * | 3/2007 | Boon et al. .................... | 382/238 |
| 2008/0175322 | A1 * | 7/2008 | Lee et al. ................. | 375/240.16 |
| 2008/0310745 | A1 | 12/2008 | Ye et al. | |
| 2009/0074060 | A1 * | 3/2009 | Kim et al. ................ | 375/240.12 |
| 2009/0086816 | A1 * | 4/2009 | Leontaris et al. ........ | 375/240.03 |
| 2009/0135915 | A1 | 5/2009 | Marpe et al. | |
| 2009/0263032 | A1 * | 10/2009 | Tanaka et al. ................. | 382/233 |
| 2010/0061609 | A1 * | 3/2010 | Shinagawa et al. ........... | 382/131 |

OTHER PUBLICATIONS

Liu, L. et al.—"Enhanced Intra Prediction Using Context-Adaptive Linear Prediction"—Proc. of the Picture Coding Symposium, Nov. 2007, Lisbon, pp. 1-4.

* cited by examiner

*Primary Examiner* — Sath V Perungavoor
*Assistant Examiner* — Jeffery Williams
(74) *Attorney, Agent, or Firm* — John P. O'Banion

(57) ABSTRACT

Context adaptive video coding is described in which encoding and decoding relies on deriving context adaptive coding tools, which can be applied within a coder (encoder and/or decoder) to one or more coding processes. A discontinuity of the block is identified, and a context feature extracted having directionality and location of discontinuity. Coding then uses the context adaptive tools to enhance coding efficiency, without the need of additional side information. Context adaptation according to invention can be applied such as to inter prediction, intra prediction, transform, interpolation filtering, and/or scanning.

31 Claims, 9 Drawing Sheets

CONTEXT ADAPTATION WITHIN VIDEO CODING MODULES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding, and more particularly to context adaptive video coding.

2. Description of Related Art

Efficient storage and communication of images and videos require the use of coding mechanisms that reduce spatial and/or temporal redundancies. Numerous encoding techniques exist toward fulfilling that goal, while continuous efforts are being made to increase the efficiencies of enCOder/DECoders (codecs) which respectively compress and decompress video data streams. The purpose of codecs is to reduce the size of digital video frames in order to speed up transmission and save storage space. Numerous video coding advances have been made over the years which have collectively contributed to the high levels of coding efficiency provided by state-of-the-art codecs. It is desired, however, that coding be performed at still higher efficiencies to further decrease video bit rates.

Accordingly, there is a need for more efficient image and video coding methods and apparatus. The present invention fulfills that need and others while overcoming shortcomings in previous coding standards.

BRIEF SUMMARY OF THE INVENTION

Efficient image and video decoding requires that the decoder be able to 'reverse' the encoding process performed by the encoder. Yet, to perform this decoding the decoder must be able to obtain information regarding the encoding process, in particular, how spatial and temporal redundancies were handled. There are two basic ways that the decoder can obtain this information: (1) side information (e.g., motion vectors, macroblock partitioning, and so forth), (2) using context information, or combinations thereof.

Side information is additional information passed to the decoder to inform it of encoding parameters, decisions, and so forth. Side information has the benefit of being directly usable, wherein the decoder need not compute or determine it, but it increases the size of the encoded file and thus decreases decoding efficiency.

In contrast to the above, using context information to control decoding, the encoded image or video is smaller, yet the decoder is required to execute additional computations to adapt the decoding and the decoding decisions, in response to the context. In using a context, it should be appreciated that both the encoder and decoder must agree on a method, or protocol, for deriving the context information.

Modern codecs, such as Advanced Video Coding (H.264/AVC) typically utilize a combination of side information and context information.

The present invention provides increased coding efficiency by adapting the coding in response to local statistics. In particular, using Direction plus Discontinuity, which is referred to herein as ($D^2$).

New apparatus and methods are taught which more extensively exploit context adaptation to improve state-of-the-art coding using piece-wise-smooth assumptions, such as during prediction and/or transform when encoding video. A quantized direction and discontinuity ($D^2$) "context feature" is first identified and associated with a context number. Based on the context number it is then determined which of the context adaptive (CA) elements within the coder are to be utilized, such as either context adaptive (CA) intra prediction matrix or a context adaptive interpolation filter. It is also selected whether to perform CA transform and CA scanning associated with that context to encode or decode the block.

The invention is amenable to being embodied in a number of ways, including but not limited to the following descriptions.

One embodiment of the invention is an apparatus for performing video coding, comprising: (a) a computer configured for encoding and/or decoding of video; a memory coupled to the computer; and (b) programming configured for retention on the memory and executable on the computer for context adaptation by the steps of, (b)(i) assuming a block within a video frame is piece-wise smooth, (b)(ii) identifying that a discontinuity exists in the block with respect to its context of neighbors, (b)(iii) extracting a context feature of the discontinuity having directionality and location of discontinuity within the block, and (b)(iv) performing coding of the block as a context adaptive operation using the context feature.

In at least one embodiment of the invention a context adaptive intra prediction matrix is applied during intra prediction to generate context adaptive intra prediction results. In at least one embodiment of the invention the context adaptive operation is a context adaptive transform applied to a prediction residual. In at least one embodiment of the invention the context adaptive transform is applied to the intra or inter prediction residual.

In at least one embodiment of the invention the context adaptive operation is an interpolation filter applied to inter motion-compensated prediction at fractional sub-pels. In at least one embodiment of the invention the programming is configured for performing the context adaptive interpolation filter by, (a) receiving an incoming bitstream for a block; (b) determining that the block is an inter-block in response to reading from the bitstream; (c) obtaining a motion vector (MV) associated with the block from the bitstream; (d) determining the motion compensated (MC) neighborhood in the reference frame according to the motion vector (MV); wherein the extracting a context feature of the discontinuity having directionality and location of discontinuity is performed on the motion compensated (MC) neighboring pixels in the reference frame; (e) determining that directionality and location of discontinuity information is available; and (f) applying the context adaptive interpolation filter, which is pre-trained and associated with the context for sub-pel motion compensated prediction to the current block.

In at least one embodiment of the invention the context adaptive scanning of transform coefficients is performed with a scanning order selected in response to the context feature. In at least one embodiment of the invention the scanning is performed with an optimal scanning order determined for each context during a training process which is preferably performed off-line.

In at least one embodiment of the invention the context feature of the discontinuity, having directionality and location of discontinuity, is at least partially determined in response to accessing the decoded neighboring block for intra coding and the decoded motion-compensated neighborhood for inter coding to increase the accuracy of the directionality and location of discontinuity. At least one embodiment of the invention further includes programming configured for extracting the directionality of the context feature of the discontinuity, comprising: (a) performing edge detection on neighboring pixels to obtain gradient vectors; (b) removing insignificant gradient samples for smooth sections of the image in response to application of a first threshold comparison and if there is no samples left, considering an area of processing as being smooth and to which the context feature is not applied; (c) performing principle component analysis on gradient vectors for remaining samples to obtain two eigenvalues and two spanning vectors; (d) assuming the spanning vector associated to the smaller eigenvalue as a smooth direction; (e) if the smaller eigenvalue is too large in response to application of a first threshold comparison, considering the area of processing as complex and do not apply the context feature; and (f) utilizing the first direction as the discontinuity direction. In at least one embodiment of the invention the programming is configured for extracting the location of discontinuity, comprising: (a) mapping a line along the direction of discontinuity; (b) determining distance from the line to the center of the current block; (c) determining an average of the distance for the block among neighboring pixels that have significant gradients; and (c) utilizing the average as the discontinuity location.

One embodiment of the invention is an apparatus for performing video coding, comprising: (a) a computer configured for encoding and/or decoding of video; (b) a memory coupled to the computer; and (c) programming configured for retention on the memory and executable on the computer for context adaptation by the steps of, (c)(i) assuming a block within a video frame is piece-wise smooth, (c)(ii) identifying that a discontinuity exists in the block with respect to its context of neighbors, (c)(iii) extracting a context feature of the discontinuity having directionality and location of discontinuity within the block, and (c)(iv) performing intra prediction in response to the context adaptive intra prediction matrix, to generate context adaptive intra prediction results, or performing inter prediction in response to the context adaptive interpolation filter to generate context adaptive inter prediction residual; and (c)(v) performing a transform in response to the context feature adaptive transform; and (c)(vi) performing coefficient scanning.

One embodiment of the invention is a method of performing video coding, comprising: (a) assuming a block within a video frame is piece-wise smooth within a coding system configured for intra prediction, transforms, and quantization; (b) identifying, within a computer configured for video coding, that a discontinuity exists in the block with respect to its context of neighbors; (c) extracting a context feature of the discontinuity having directionality and location of discontinuity; and (d) performing coding of the block as a context adaptive operation using the context feature.

One embodiment of the invention is an apparatus for performing video coding, comprising: (a) a computer configured for encoding and/or decoding of video; (b) a memory coupled to the computer; and (c) programming configured for retention on the memory and executable on the computer for context adaptation by the steps of, (c)(i) assuming a block within a video frame is piece-wise smooth, (c)(ii) identifying that a discontinuity exists in the block with respect to its context of neighbors, (c)(iii) extracting a context feature of the discontinuity having directionality and location of discontinuity, (c)(iv) deriving an appropriate set of tools, which may include any or all of the following: a context adaptive intra prediction matrix for intra prediction; a context adaptive interpolation filter for inter prediction; a context adaptive transform for residual transform; and a context adaptive scanning order for scanning of transform coefficients, and (c)(v) performing coding of the block using the derived set of tools.

In at least one implementation, a context adaptive intra prediction matrix is applied during intra prediction to generate context adaptive intra prediction results. In at least one implementation, a context adaptive interpolation filter is applied during inter motion-compensated prediction at fractional sub-pels to generate context adaptive inter prediction results. In at least one implementation a context adaptive transform is applied to the inter or intra prediction residual. In at least one implementation, a context adaptive coefficient scanning order is applied in scanning of the transform coefficients. In at least one implementation, some or all of the above tools are combined.

In at least one implementation, the directionality is extracted in response to programming configured for performing the steps, comprising: (a) performing edge detection on neighboring pixels in intra prediction, or on motion compensated neighboring pixels in the reference frame in inter prediction to obtain gradient vectors; (b) removing insignificant gradient samples for smooth sections of the image in response to application of a first threshold comparison, and if there is no samples left, considering the area of processing as smooth and do not apply direction and discontinuity ($D^2$ context); (c) performing principle component analysis on gradient vectors for remaining samples to obtain two eigenvalues and two spanning vectors; (d) assuming the spanning vector associated to the smaller eigenvalue as a smooth direction, and if the smaller eigenvalue is too large in response to application of a first threshold comparison, considering the area of processing as complex and do not apply the context feature; and (e) utilizing the smooth direction as the direction in the direction and discontinuity ($D^2$ context).

In at least one implementation, the location of the discontinuity is determined in response to programming configured for performing the steps, comprising: (a) mapping a line along the direction of direction and discontinuity ($D^2$ context); (b) determining distance from the line to the center of the current block; (c) determining an average of the distance for the block among neighboring pixels that have significant gradients; and (d) utilizing the average as the discontinuity location.

The present invention provides a number of beneficial elements which can be implemented either separately or in any desired combination without departing from the present teachings.

An element of the invention provides increased efficiency within video coding systems.

Another element of the invention is an advanced coding technique in which context adaptation is utilized which includes direction and discontinuity location within a block.

Another element of the invention is an advanced coding technique in which a context adaptive intra prediction matrix is used during intra prediction to generate context adaptive intra prediction results.

Another element of the invention is an advanced coding technique in which a context adaptive interpolation filter is used for motion compensated inter prediction to generate context adaptive inter prediction results.

Another element of the invention is an advanced coding technique in which a context adaptive transform is applied to the prediction residual.

Another element of the invention is an advanced coding technique in which a context adaptive scanning order is applied to the scanning of transform coefficients.

Another element of the invention is an advanced coding technique in which the context adaptation based on $D^2$ provides improved coding efficiency in response to training.

A still further element of the invention is that is has been shown to reduce mean square error (MSE) of the coded video signal.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

The present invention improves video coding efficiency by configuring the process elements within the coder to adapt to local statistics, in particular Direction+Discontinuity ($D^2$). Context adaptive coding tools are derived which allow context features of a discontinuity, having directionality and location of discontinuity within the block, to be applied to a process element in the coding apparatus. The derivation of the tools, and therefore, the context adaptation of the process elements in the coding apparatus, are based on local statistics and in particular assuming that blocks are piece-wise smooth, followed by determining if they contain a discontinuity and determining its location and direction.

The present $D^2$ invention can provide significant benefits in a number of video coding modules/processes to which the tools are applied. The application describes the derivation of $D^2$, as well as its application to intra prediction, inter prediction, transform stage, and the scanning order of transform coefficients.

1. Video Coding Apparatus Embodiment.

Figure 1A:
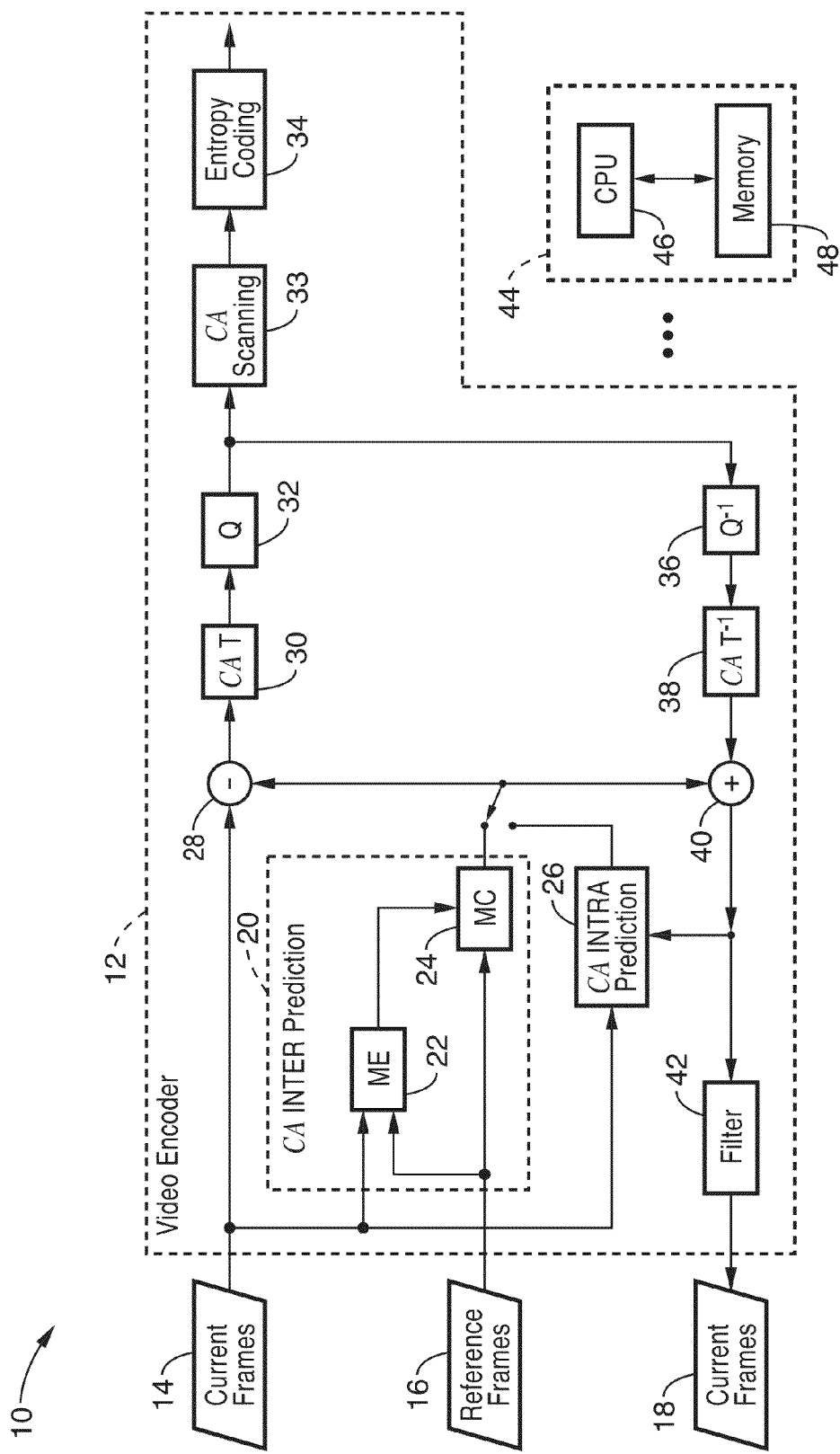
FIG. 1A-1B are block diagrams of an encoder and decoder apparatus configured according to an embodiment of the present invention.
Figure 1B:
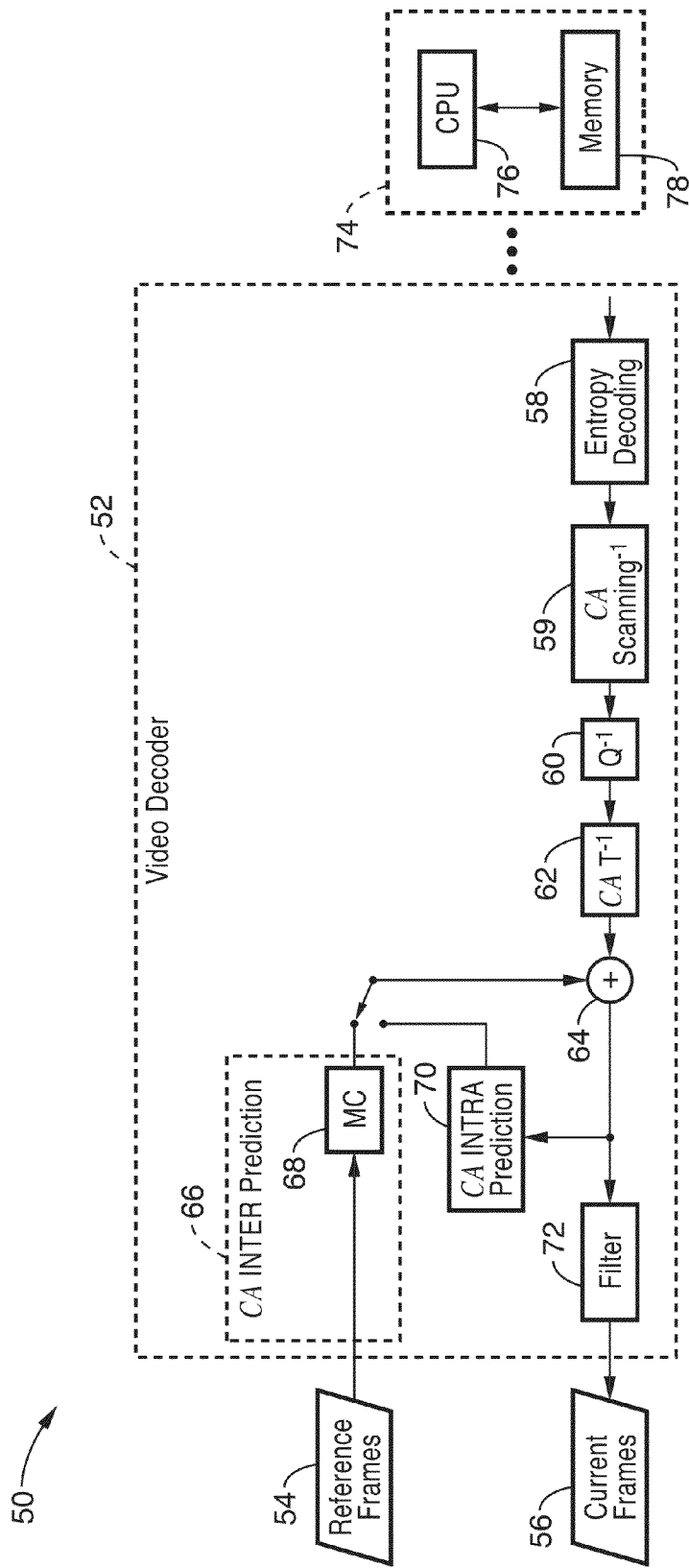

FIG. 1A-1B illustrate an example embodiment of a coding apparatus comprising an encoder 10 and decoder 50 configured according to the invention for context adaptive coding.

In the embodiment of the invention shown in FIG. 1A-1B, the invention can be implemented within the processing blocks of an otherwise conventional video coding system to minimize development and maximize compatibility. For the sake of simplicity of illustration, each of the processing blocks which can utilize the context adaptive information described herein are depicted to include the text "CA". It should be appreciated that although a number of such blocks are shown, the invention can be implemented with any one or more of the processing blocks configured using the context adaptation described herein. Embodiments are described for example which utilize the context adaption during prediction, and/or transform, while the other block processes are described.

The encoder 10 is shown in FIG. 1A having encoding elements 12 executed by one or more processors 44. In this example, frames are denoted as input current frame 14, reference frame 16 and output current frame 18. Context adaptive inter prediction 20 is depicted with motion estimation (ME) 22, and motion compensation (MC) 24. Context adaptive intra prediction 26 is shown with switching between the inter and intra prediction. A sum junction 28 is shown with output to a context adaptive (forward) transform 30, quantization 32, context adaptive coefficient scanning 33 and entropy coding 34. An inverse quantization 36 and context adaptive inverse transform 38 are shown coupled to a summing junction 40 and followed by a filter 42 (deblocking and/or loop filter).

It should be appreciated that the encoder is shown implemented with a processing means 44, such as comprising at least one processing device (e.g., CPU) 46 and at least one memory 48 for executing programming associated with the encoding. In addition, it will be appreciated that elements of the present invention can be implemented as programming stored on a media, which can be accessed for execution by a CPU for the encoder and/or decoder.

It should be appreciated, that although a number of the blocks of the encoder are shown configured for context adaptive operation, the present invention can be practiced with these elements implemented separately or with any desired combination of these context adaptive elements, while the teachings presented herein can be utilized to extend applicability to allow operation of additional context adaptive elements within the encoder without departing from the teachings of the present invention.

In the decoder 50 of FIG. 1B, decoding blocks 52 are shown along with a processing means 74, which is substantially a subset of the elements contained in the encoder, shown in FIG. 1A, operating on reference frames 54 and outputting current frame 56. The decoder blocks include an entropy decoder 58, context adaptive inverse coefficient scanning 59, inverse quantization 60, context adaptive inverse transforms 62 which each are shown configured for context adaptation according to an embodiment of the invention. Summing 64 is shown between the inverse transform 62 output and the selection between context adaptive inter prediction 66 shown with motion compensation 68 and context adaptive intra prediction 70. Output from summing junction 64 is received by filter 72, which can be configured according to the present invention as a loop filter, a deblocking filter, or any combination thereof. It should be appreciated that the decoder can be implemented with a processing means 74 which comprises at least one processing device 76 and at least one memory 78 for executing programming associated with the encoding.

It should be appreciated, that although a number of the blocks of the decoder are shown configured for context adaptive operation, the present invention can be practiced with these elements separately or with any desired combination of these context adaptive elements, while the teachings presented herein can be utilized to extend applicability to allow operation of additional context adaptive elements within the decoder without departing from the teachings of the present invention.

2. Assumptions for Using Context Based on $D^2$.

The direction and discontinuity-location of the context adaptive method and apparatus are referred to herein as $D^2$. The use of $D^2$ according to the invention is based on the assumption that image signals are usually piecewise smooth, and that within each piece, pixel correlation is high, while between different pieces, pixel correlation is weak.

Figure 2:
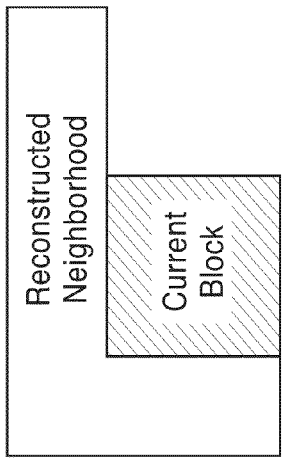
FIG. 2 is an image rendition of a block having a discontinuity with other portions being assumed flat according to one element of the present invention.

FIG. 2 illustrates an image pattern with a discontinuity between two "flat" sections (pieces) in the image. In view of the presence of such discontinuities it is preferred: (1) not to predict one pixel from pixels in other pieces; (2) not to apply a low pass filter across piece boundaries; and (3) not to apply a traditional transform, such as DCT, on pixels from different pieces. The present invention provides for controlling the execution, such as of prediction, filtering and transforms, in response to a context feature known as $D^2$.

3. Direction Derivation for $D^2$.

Direction derivation is performed in response to the type of prediction.

It will be recognized that a form of directional intra predictions are known within the H.264 coding standard, with limited directionality (e.g., 8 directional predictions and 1 DC prediction). Direction of the current block is predicted from directions of neighboring blocks, whereby these direction predictions are not accurate. In the present invention the intra prediction directions are derived as part of the context from the available neighborhood.

Direction inter prediction is performed according to the invention in response to analyzing the neighborhood in the reference frame after integer-pel motion compensation.

Figure 3:
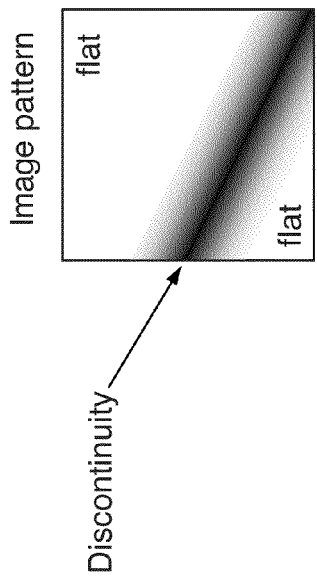
FIG. 3 is a diagram of a current block shown with reconstructed neighborhood utilized during derivation of the $D^2$ context for an intra-predicted block according to an element of the present invention.

FIG. 3 depicts a current block shown with its reconstructed neighborhood.

Figure 4:
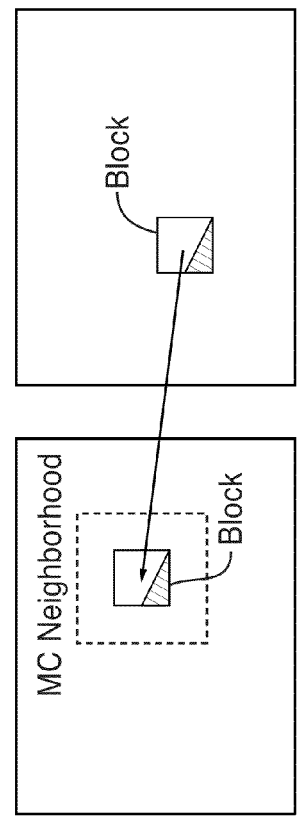
FIG. 4 is a diagram of a motion compensated block within an adjacent frame for which the $D^2$ context can be derived for an inter-predicted block according to an element of the present invention.

FIG. 4 depicts a motion compensated block (e.g., after integer-pel motion compensation) from temporally adjacent frames and illustrates a motion compensated neighborhood in the dashed lines.

It should be appreciated that direction prediction is the same for intra and inter prediction insofar as the inter prediction is performed after motion compensation.

Figure 5:
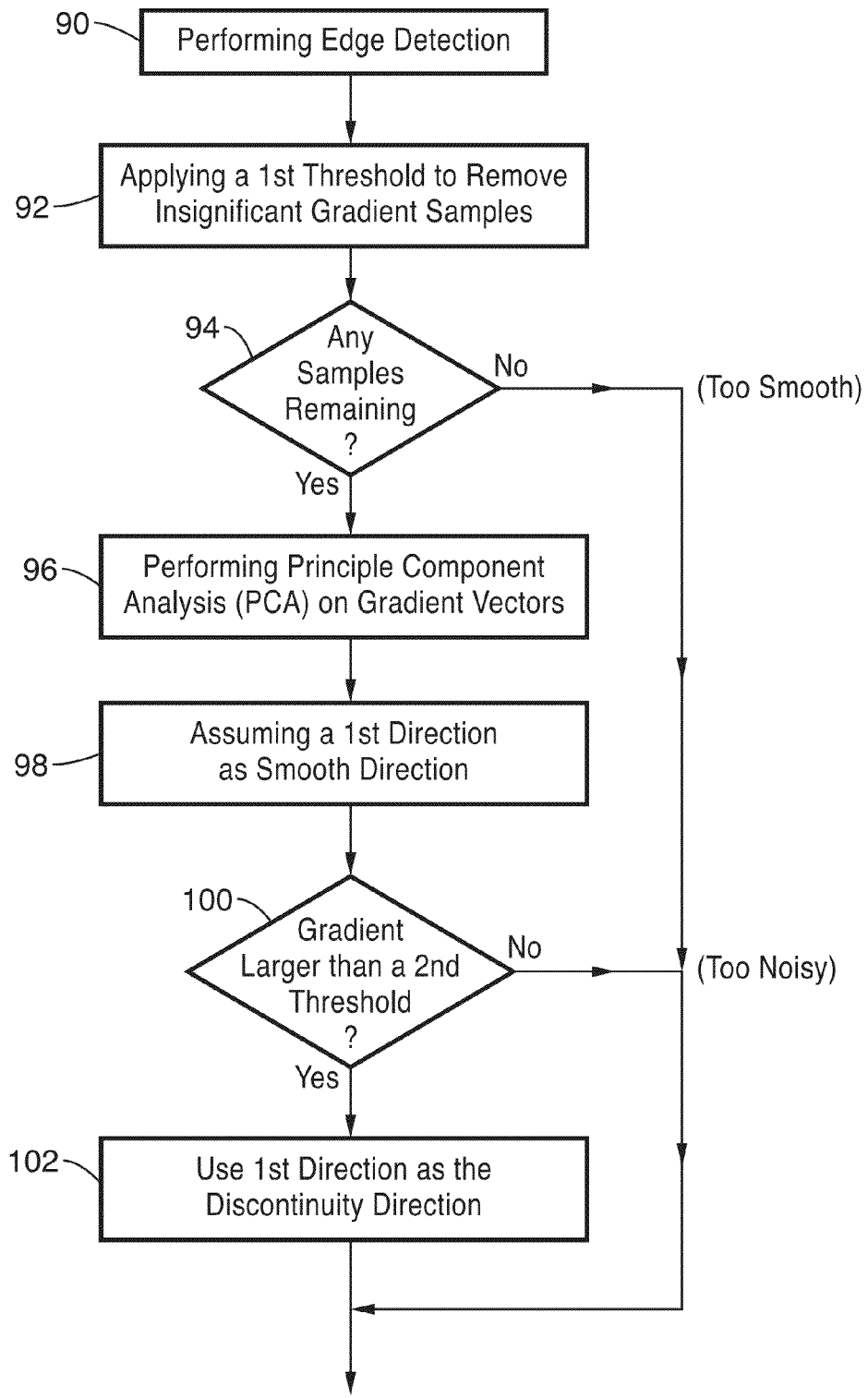
FIG. 5 is a flow diagram of determining direction of $D^2$ according to an element of the present invention.

FIG. 5 illustrates generalized steps in determining the direction in response to the $D^2$ mechanism according to the invention. Detecting of an edge is performed 90 on the reconstructed neighborhood, such as using the Sobel edge detector, or any desired mechanism. Accordingly, for each neighboring pixel, the Gradient vector $(G_x, G_y)$ is obtained. A threshold is then applied 92 (first threshold) to remove samples with insignificant gradients (e.g., $|G_x|<T_0$ and $|G_y|<T_0$). A check 94 is then made. If there are no samples remaining after the thresholding process, then this is considered a smooth region whereby the $D^2$ context is not utilized. Otherwise, a principle component analysis (PCA) is performed in step 96 on the remaining gradient vectors. The PCA yields two eigenvalues $(\lambda_0, \lambda_1)$, and two orthogonal spanning vectors $(d_0, d_1)$, associated with $(\lambda_0, \lambda_1)$ respectively. Without loss of generality, the embodiment of the method in step 98 assumes $(\lambda_0 \leq \lambda_1)$, which means the current area is smoother along the $d_0$ direction rather than the $d_1$ direction (which is perpendicular to $d_0$). A check 100 is made to determine if $\lambda_0$ is larger than a second threshold $T_1$, then the area is considered noisy and $D^2$ is not applied. Otherwise, in step 102 $d_0$ is utilized as the direction for $D^2$. It will be noted that after PCA, the spanning vector of which the associated eigenvalue is the smallest is considered as the direction. If $(\lambda_0 > \lambda_1)$, then $d_1$ is utilized. However, in PCA it should be appreciated that the ordering of the eigenvalues are arbitrary, wherein one can always assume $(\lambda_0 \leq \lambda_1)$.

4. Discontinuity Derivation for $D^2$.

Figure 6B:
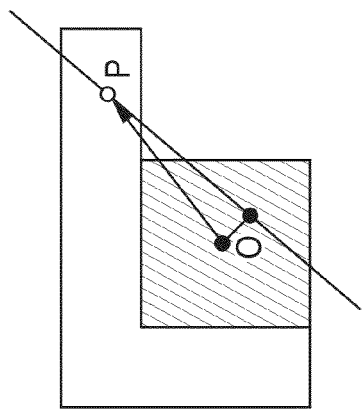
FIG. 6A-6B are diagrams of discontinuity location of $D^2$ derivation according to an element of the present invention.
Figure 6A:
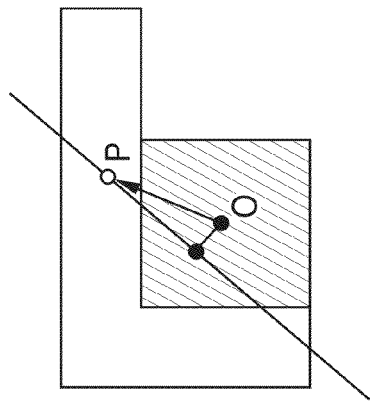

FIGS. 6A and 6B illustrate an example of discontinuity derivation according to the present invention in reference to the following discussion.

Figure 7:
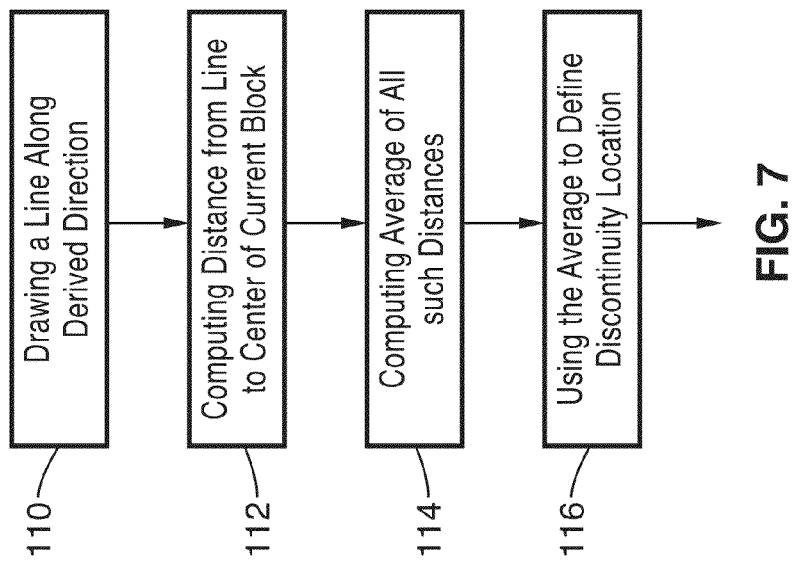
FIG. 7 is a flow diagram for deriving the discontinuity location according to an element of the present invention.

FIG. 7 illustrates steps according to an example embodiment of deriving the discontinuity. Once the direction is determined, such as according to the steps depicted in FIG. 5, the discontinuity can be defined. The following example is described for intra prediction, by way of example and not limitation. For every reconstructed neighboring pixel, marked P in FIG. 6A-6B, which has sufficient gradient to survive the check in block 100 of FIG. 5, a line is drawn 110 along the derived direction, and the distance of the line to the center, marked O in FIG. 6A-6B, of the current block is determined 112. Then the average is computed 114 of all such distances among neighboring pixels that have significant gradients. This average value is then utilized 116 to define the discontinuity location in $D^2$. It should be noted that the distance is preferably signed for distinguishing the two cases shown below. Therefore, the distance is defined as the inner product of vector OP and direction $d_1$.

It should be appreciated that if there is a single edge (discontinuity) crossing the current block, then $D^2$ according to the present invention uniquely defines the partitioning of the two pieces.

5. Quantization of the Context in $D^2$.

In definitions according to previous example implementations, both the direction and the discontinuity location are continuous values. However, toward reducing complexity, the directions can be quantized and the discontinuity locations converted into discrete values. By way of example and not limitation, the discrete values may comprise eight (8) directions, with four (4) discontinuity locations for each direction, for an overall thirty two (32) contexts being defined. The quantization may be performed to any desired level, without the need to follow these thirty two levels.

6. Utilization of the Context in $D^2$.

The present invention $D^2$ is configured for utilizing the context information in a number of coding stages (e.g., modules, steps, computations), including but not limited to: (a) intra prediction, (b) inter prediction, (c) residual transform, and (d) scanning of the transform coefficients.

Prior to utilizing the context information, offline training should first be performed so that a proper arrangement of context adaptive elements can be created for each of the discrete contexts. In response to one embodiment of offline training, the following are obtained for each context: (1) an intra prediction matrix for intra prediction, (2) a set of interpolation filters for inter prediction, (3) a transform matrix for residual transform, and (4) a scanning order. The training results are incorporated into both the encoder and decoder, such as by establishing protocols to "hardwire" the results into the encoder and decoder.

During encoding and decoding, a context derivation is first applied, and if a $D^2$ context is identified, the encoder and decoder can use the training results under that context in various coding processes, including but not limited to: intra prediction, inter prediction, residual transform and scanning of transform coefficients.

7. Context Adaptive Intra Prediction in $D^2$.

Figure 8B:
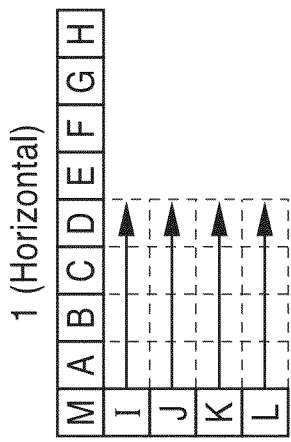
FIG. 8A-8B are diagrams of fixed prediction directions (vertical/horizontal) as utilized within the AVC standard.
Figure 8A:
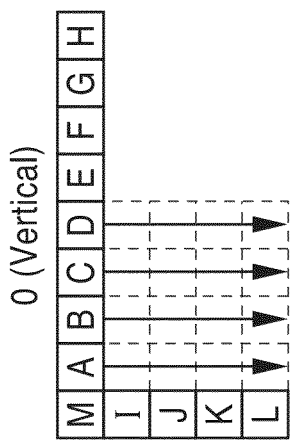

FIG. 8A-8B depict fixed prediction directions (vertical/horizontal) as utilized within the AVC standard for each mode. AVC coding requires that side information be sent to inform the decoder whether to perform vertical or horizontal prediction.

A residual vector is generated in response to the combination of a signal vector and a constant matrix (fixed) multiplied by a vector of its neighbors. In the present invention this AVC approach is represented as follows:

$$e = x - P_m y$$

where e represents a residual vector, x represents a signal vector, y represents a vector for reconstructed pixels in neighboring blocks, and $P_m$ represents a fixed matrix for an encoding mode m.

However, according to an embodiment of the present invention, the fixed predictions, such as of AVC, can be replaced by prediction modes selected in response to the local block statistics. This form can be represented as follows:

$$e = x - P_{m,c} y$$

where c represents a context feature where c=f(y).

It should be noted that in AVC, 8 out of the 9 modes are directional, whereby some redundancy exists between m and c. Accordingly, one of two options can be selected: (1) utilize m as the direction in $D^2$, to save the computation in direction derivation; or (2) utilize direction in $D^2$ to predict m, to reduce the overhead bits in signaling m.

The present invention teaches that for each (m,c) pair an appropriate prediction matrix is determined through off-line training. The direction and discontinuity-location of the context adaptive method and apparatus are referred to herein as $D^2$.

This embodiment of the present invention can be referred to as context-adaptive intra prediction (CAIP). It will be appreciated that the decoder does not need to receive side information to control its decoding modes to match the encoder, since it also determines local context in response to its frames, such as depicted by block neighborhood y. Local context information is provided by neighboring pixels, such as by locating discontinuities in response to evaluating the "L" shapes, which are the neighborhood pixels used for deriving $D^2$, and which have already been decoded.

To perform CAIP the context feature must be extracted as given by: c=f(y), where c is the context feature as a function f( ) of the local neighborhood y using the aforementioned method. For each mode and context pair (m,c), an appropriate prediction matrix is derived $P_{(m,c)}$, such as through off-line training as $P_{(m,c)}$ is not in the encoded bitstream. Statistical prediction can be optimized to code more efficiently. By way of example implementation and not limitation, $P_{(m,c)}$ is a 16×13 matrix for 4×4 intra prediction, although other matrix configurations can be utilized without departing from the invention. Since the decoder knows c, it is able to determine m, without the need of additional information being sent from the encoder.

7. Context Adaptive Interpolation Filtering Using $D^2$.

AVC uses a fixed interpolation filter for inter motion-compensated (MC) prediction at fractional sub-pels, which has similar form as for intra prediction, as given by:

$$e = x - P_{s,c} y$$

in which y represents motion-compensated neighbors, c is the context feature, s is sub-pel positions (e.g., which can assume 16 different values for quarter-pel MC), and $P_{s,c}$ represents the offline-trained prediction matrix.

In this aspect of the invention, the filtering operation is replaced with a matrix multiplication, because in view of the discontinuity, the shift-invariant property does not hold any more, in other words that assumption is invalid.

To reduce complexity, however, shift-invariance can still be assumed along the edge direction, with directional filters utilized instead of matrix multiplication. That is, only the direction portion of $D^2$ is used as the context, whereby the MC prediction becomes the following:

$$e = x - f_{s,c} * y.$$

In the above, $f_{s,c}$ is the off-line trained directional filter, with c containing direction information only, and the * operator denoting convolution.

Figure 9:
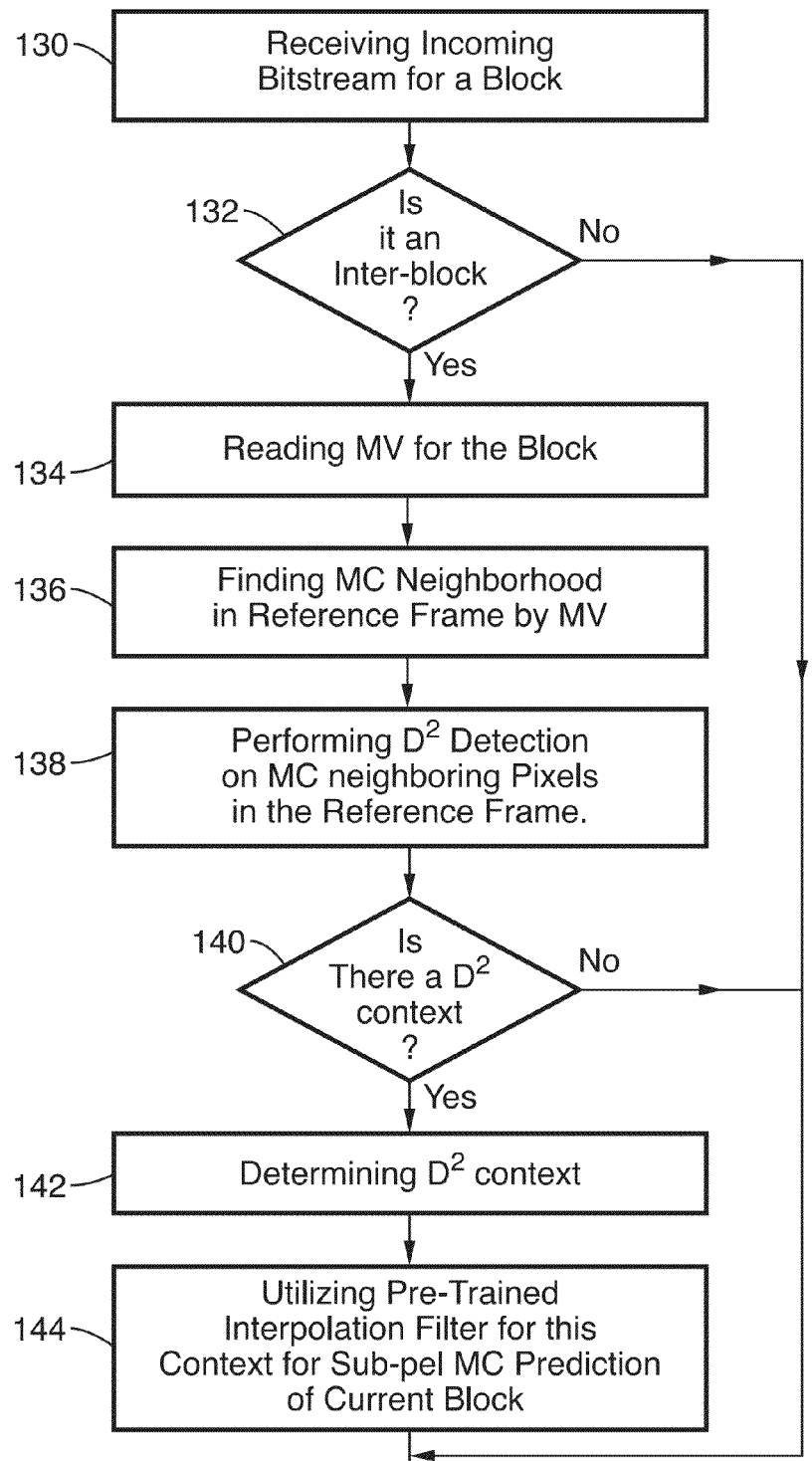
FIG. 9 is a flow diagram for performing a context adaptive interpolation filter according to an element of the present invention.

FIG. 9 illustrates an example embodiment of interpolation filter method steps according to the present invention. The decoder receives 130 an incoming bitstream for a block. The decoder reads from the bitstream for determining 132 if this is an inter-block. If it is not an inter-block, then the CA interpolation filter is not used, and program flow branches beyond block 144. If the current block is an inter-block, then the decoder reads 134 the motion vector (MV) associated with the block from the bitstream. In block 136 the decoder finds the motion compensated (MC) neighborhood in the reference frame according to the motion vector (MV). The decoder performs $D^2$ detection in block 138 on the motion compensated (MC) neighboring pixels in the reference frame. A determination is then made 140 if there exists $D^2$ information. If no $D^2$ information is detected, then the $D^2$ context is not utilized and program flow branches beyond block 144. Otherwise, upon determining a $D^2$ context a pre-trained interpolation filter associated with the context for sub-pel motion compensated prediction is utilized 144 for the current block. It will be noted that the quantized direction and discontinuity is first used to identify the context number, from which various context adaptive elements of the coding can be selected. For example, in response to the context number it is selected whether to perform a CA intra prediction matrix or a CA interpolation filter, and whether to CA transform and CA scanning associated with that context to encode or decode the block.

8. Context Adaptive Residual Transform Using $D^2$.

Instead of using a single transform (e.g., DCT), the present invention is configured for determining (e.g., computing) context information c, which is utilized in association with the offline-trained transform matrix for c.

In considering the difference with regard to Mode Dependent Directional Transform (MDDT). It will be appreciated that $D^2$ contains not only directional information, but also the discontinuity location.

Figure 10A:
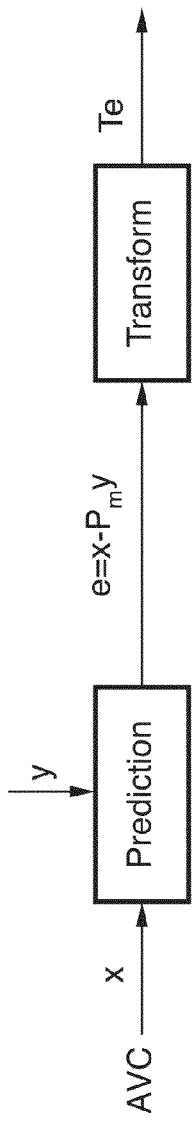
FIG. 10A-10C are schematics comparing intra directional prediction and transform coding (CAIP+CAIT) according to an embodiment of the present invention, shown compared with AVC and MDDT coding.
Figure 10B:
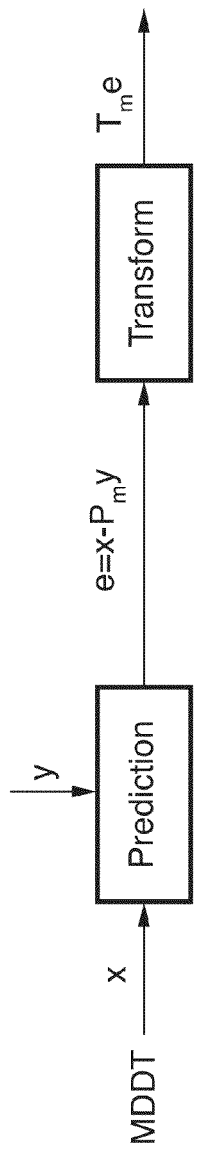
Figure 10C:
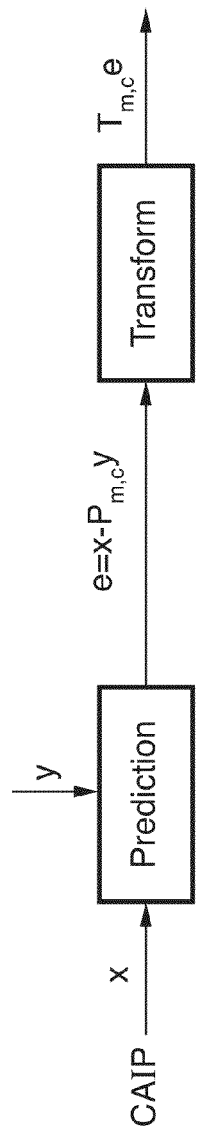

FIG. 10A-10C illustrate an example of context adaptation in both prediction and transform as seen in FIG. 10C, which is shown along side of conventional AVC coder in FIG. 10A and mode-dependent directional transform (MDDT) in FIG. 10B. It will be noted that AVC and MDDT coding have a prediction that is mode dependent $e=x-P_m y$. The transform for AVC is depicted as Te which does not depend on the mode; while in MDDT it is mode dependent as $T_m e$. However, as MDDT does not consider context, the transform could be taken across the edges of a discontinuity in the block. In contrast to the above, the context adaptable coding (CA) according to the invention, is shown with a context adaptable prediction $e=x-P_{m,c} y$ (CAIP) and a context adaptable transform (CAIT) $T_{m,c} e$ as seen in FIG. 10C. The prediction has a residual to which a transform is applied to yield a transform matrix. In response to identifying and locating the discontinuity using information from neighboring blocks, the transform can be prevented from crossing the boundary of the discontinuity.

The above example is based on intra prediction. However, it is applicable to inter prediction, by only replacing the intra residual $e=x-P_{m,c} y$ with the inter residual $e=x-f_{s,c}*y$.

9. Context Adaptive Coefficient Scanning Using $D^2$.

In AVC, a fixed zigzag scanning order has been utilized, which generally provides acceptable results with larger coefficients typically being scanned earlier. However, in response to specific contexts having different power spectrum shapes, one fixed scanning order is not always optimal. The present invention accordingly trains an optimal scanning order for each context, according to the power spectrum of the residual signal.

10. Generalized Context Adaptation.

Figure 11:
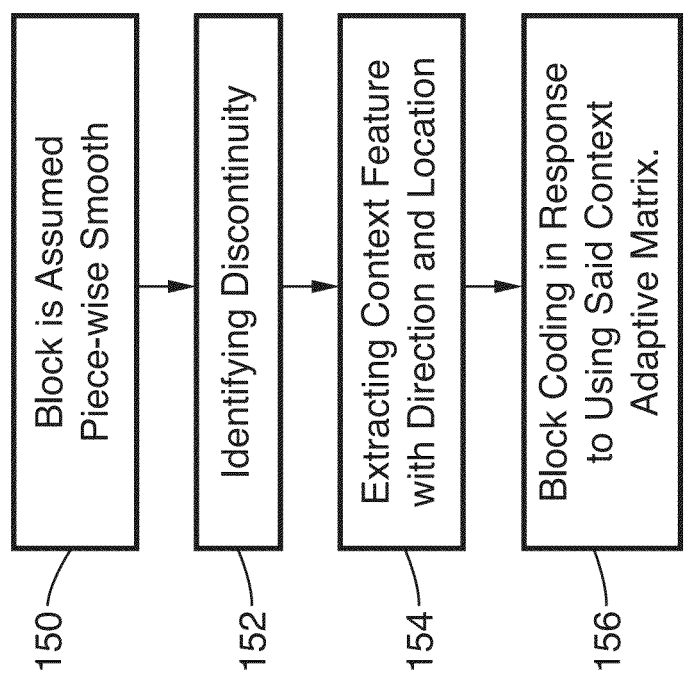
FIG. 11 is a flow diagram of deriving a $D^2$ context and in response to which video coding is performed according to an embodiment of the present invention.

FIG. 11 illustrates by way of example embodiment the steps in determining a context feature and its application within a module of the video coder. Blocks are considered to be piece-wise smooth 150, and a discontinuity is identified 152, if one exists, whereby the direction and location of the discontinuity are determined in extracting 154 a context feature from neighboring blocks. The context feature is applied 156 during the coding (encoding and/or decoding) to increase coding efficiency.

The present invention provides methods and apparatus for context adaptive coding in a state-of-the-art video coder. Inventive teachings can be applied in a variety of apparatus and applications, including codecs and other image and video processing apparatus in which context information for the local block neighborhood can be derived.

As can be seen, therefore, the present invention includes the following inventive embodiments among others:

1. An apparatus for performing video coding, comprising: a computer configured for encoding and/or decoding of video; and programming executable on said computer for context adaptation by performing steps comprising: assuming a block within a video frame is piece-wise smooth; identifying that a discontinuity exists in the block with respect to its context of neighbors; extracting a context feature of said discontinuity having directionality and location of discontinuity within the block; and performing coding of said block as a context adaptive operation in response to said context feature.

2. The apparatus of embodiment 1, wherein said context adaptive operation comprises a context adaptive intra prediction in which a context adaptive intra prediction matrix is applied during intra prediction to generate context adaptive intra prediction results.

3. The apparatus of embodiment 1, wherein said context adaptive operation is a context adaptive transform applied to a prediction residual.

4. The apparatus of embodiment 3, wherein said context adaptive transform is applied to the intra or inter prediction residual.

5. The apparatus of embodiment 1, wherein said context adaptive operation is an interpolation filter applied to inter motion-compensated prediction at fractional sub-pels as a context adaptive interpolation filter.

6. The apparatus of embodiment 5, wherein said programming is configured for performing said context adaptive interpolation filter by performing steps comprising: receiving an incoming bitstream for a block; determining that the block is an inter-block in response to reading from the bitstream; obtaining a motion vector (MV) associated with the block from the bitstream; determining the motion compensated (MC) neighborhood in the reference frame according to the motion vector (MV); wherein said extracting a context feature of said discontinuity having directionality and location of discontinuity is performed on the motion compensated (MC) neighboring pixels in the reference frame; determining that directionality and location of discontinuity information is available; and applying said context adaptive interpolation filter, which is pre-trained and associated with context for sub-pel motion compensated prediction of the block.

7. The apparatus of embodiment 1, wherein said context adaptive operation comprises a context adaptive scanning of transform coefficients which is performed with a scanning order selected in response to said context feature, and a scanning order determined for each context during an off-line training process.

8. The apparatus of embodiment 1, wherein said directionality and location of discontinuity is at least partially determined in response to accessing a decoded neighboring block for intra coding and a decoded motion-compensated neighborhood for inter coding to increase accuracy of the directionality and location of discontinuity.

9. The apparatus of embodiment 1, wherein said programming is configured for extracting directionality of said context feature of said discontinuity, by performing steps comprising: performing edge detection on neighboring pixels to obtain gradient vectors; removing insignificant gradient samples for smooth sections of an image in response to application of a first threshold comparison and if there is no samples left, considering an area of processing as being smooth and to which the context feature is not applied; performing principle component analysis on gradient vectors for remaining samples to obtain two eigenvalues and two spanning vectors; assuming the spanning vector associated with the smaller eigenvalue as a smooth direction; considering an area of processing as complex and not applying said context feature if the smaller eigenvalue exceeds a first threshold comparison; and utilizing said first direction as the discontinuity direction.

10. The apparatus of embodiment 1, wherein said programming is configured for extracting said location of discontinuity, by performing steps comprising: mapping a line along a direction of discontinuity; determining distance from said line to the center of a current block; determining an average of said distance for said block among neighboring pixels that have significant gradients; and utilizing said average as the discontinuity location.

11. An apparatus for performing video coding, comprising: a computer configured for encoding and/or decoding of video; and programming executable on said computer for context adaptation by performing steps comprising: assuming a block within a video frame is piece-wise smooth; identifying that a discontinuity exists in the block with respect to its context of neighbors; extracting a context feature of said discontinuity having directionality and location of discontinuity within the block; performing intra prediction in response to said context adaptive intra prediction matrix, to generate context adaptive intra prediction results, or performing inter prediction in response to said context adaptive interpolation filter to generate context adaptive inter prediction residual; performing a transform in response to said context feature adaptive transform; and performing coefficient scanning.

12. The apparatus of embodiment 11, wherein said programming for said context adaptive intra prediction is configured for applying a context adaptive intra prediction matrix during intra prediction to generate context adaptive intra prediction results.

13. The apparatus of embodiment 11, wherein said transform comprises a context adaptive transform applied to a prediction residual.

14. The apparatus of embodiment 13, wherein said context adaptive transform is applied to the intra or inter prediction residual.

15. The apparatus of embodiment 11, wherein said scanning comprises a context adaptive scanning of transform coefficients performed with a scanning order selected in response to said context feature.

16. The apparatus of embodiment 15, wherein an optimal scanning order is determined for each context during a training process.

17. The apparatus of embodiment 11, wherein said programming further comprises a context adaptive interpolation filter which is applied to inter motion-compensated prediction at fractional sub-pels performed in response to said context feature.

18. The apparatus of embodiment 17, wherein said programming is configured for performing said context adaptive interpolation filter by performing steps comprising: receiving an incoming bitstream for a block; determining that the block is an inter-block in response to reading from the incoming bitstream; obtaining a motion vector (MV) associated with the block from the incoming bitstream; determining the motion compensated (MC) neighborhood in a reference frame according to the motion vector (MV); wherein said extracting of a context feature of said discontinuity having directionality and location of discontinuity is performed on the motion compensated (MC) neighboring pixels in a reference frame; determining that directionality and location of discontinuity information is available; and applying said context adaptive interpolation filter, which is pre-trained and associated with a context for sub-pel motion compensated prediction to a current block.

19. The apparatus of embodiment 11, wherein said context feature is at least partially determined in response to accessing a decoded neighboring block for intra coding and decoded motion-compensated neighborhood for inter coding to increase accuracy of directionality and location of discontinuity.

20. A method of performing video coding, comprising: assuming a block within a video frame is piece-wise smooth within a coding system configured for intra prediction, transforms, and quantization; identifying, within a computer configured for video coding, that a discontinuity exists in the block with respect to its context of neighbors; extracting a context feature of said discontinuity having directionality and location of discontinuity; and performing coding of the block as a context adaptive operation in response to said context feature.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for performing video coding, comprising:
   (a) a computer configured for encoding and/or decoding of video; and
   (b) programming executable on said computer for context adaptation by performing steps comprising:
      (i) assuming a block within a video frame is piece-wise smooth;
      (ii) identifying that a discontinuity exists in the block with respect to its context of neighbors;
      (iii) extracting a context feature of said discontinuity having directionality and location of discontinuity within the block, with location of discontinuity extracted in response to steps, including:
         (iii)(1) mapping a line along a direction of discontinuity;
         (iii)(2) determining distance from said line to the center of a current block;
         (iii)(3) determining an average of said distance for said block among neighboring pixels that have significant gradients;
         (iii)(4) utilizing said average as the discontinuity location; and
      (iv) performing coding of said block as a context adaptive operation in response to said context feature.

2. The apparatus recited in claim 1, wherein said context adaptive operation comprises a context adaptive intra prediction in which a context adaptive intra prediction matrix is applied during intra prediction to generate context adaptive intra prediction results.

3. The apparatus recited in claim 1, wherein said context adaptive operation is a context adaptive transform applied to a prediction residual.

4. The apparatus recited in claim 3, wherein said context adaptive transform is applied to the intra or inter prediction residual.

5. The apparatus recited in claim 1, wherein said context adaptive operation is an interpolation filter applied to inter motion-compensated prediction at fractional sub-pels as a context adaptive interpolation filter.

6. The apparatus recited in claim 5, wherein said programming is configured for performing said context adaptive interpolation filter by performing steps comprising:
   receiving an incoming bitstream for a block;
   determining that the block is an inter-block in response to reading from the bitstream;
   obtaining a motion vector (MV) associated with the block from the bitstream;
   determining the motion compensated (MC) neighborhood in the reference frame according to the motion vector (MV);
   wherein said extracting a context feature of said discontinuity having directionality and location of discontinuity is performed on the motion compensated (MC) neighboring pixels in the reference frame;
   determining that directionality and location of discontinuity information is available; and
   applying said context adaptive interpolation filter, which is pre-trained and associated with context for sub-pel motion compensated prediction of the block.

7. The apparatus recited in claim 1, wherein said context adaptive operation comprises a context adaptive scanning of transform coefficients which is performed with a scanning order selected in response to said context feature, and a scanning order determined for each context during an off-line training process.

8. The apparatus recited in claim 1, wherein said directionality and location of discontinuity is at least partially determined in response to accessing a decoded neighboring block for intra coding and a decoded motion-compensated neighborhood for inter coding to increase accuracy of the directionality and location of discontinuity.

9. The apparatus recited in claim 1, wherein said programming is configured for extracting directionality of said context feature of said discontinuity, by performing steps comprising:
   performing edge detection on neighboring pixels to obtain gradient vectors;
   removing insignificant gradient samples for smooth sections of an image in response to application of a first threshold comparison and if there is no samples left, considering an area of processing as being smooth and to which the context feature is not applied;
   performing principle component analysis on gradient vectors for remaining samples to obtain two eigenvalues and two spanning vectors;
   assuming the spanning vector associated with the smaller eigenvalue as a smooth direction;
   considering an area of processing as complex and not applying said context feature if the smaller eigenvalue exceeds a first threshold comparison; and
   utilizing said first direction as the discontinuity direction.

10. An apparatus for performing video coding, comprising:
   (a) a computer configured for encoding and/or decoding of video; and
   (b) programming executable on said computer for context adaptation by performing steps comprising:
      (i) assuming a block within a video frame is piece-wise smooth;
      (ii) identifying that a discontinuity exists in the block with respect to its context of neighbors;
      (iii) extracting a context feature of said discontinuity having directionality and location of discontinuity within the block;
      (iv) executing a context adaptive interpolation filter which is applied to inter motion-compensated prediction at fractional sub-pels performed in response to said context feature, and performed by steps including:
         (iv)(1) receiving an incoming bitstream for a block;
         (iv)(2) determining that the block is an inter-block in response to reading from the incoming bitstream;
         (iv)(3) obtaining a motion vector (MV) associated with the block from the incoming bitstream;
         (iv)(4) determining the motion compensated (MC) neighborhood in a reference frame according to the motion vector (MV);

(iv)(5) wherein said extracting of a context feature of said discontinuity having directionality and location of discontinuity is performed on the motion compensated (MC) neighboring pixels in a reference frame;

(iv)(6) determining that directionality and location of discontinuity information is available; and (iv)(7) applying said context adaptive interpolation filter, which is pre-trained and associated with a context for sub-pel motion compensated prediction to a current block;

(v) performing intra prediction in response to a context adaptive intra prediction matrix, to generate context adaptive intra prediction results, or performing inter prediction in response to said context adaptive interpolation filter to generate context adaptive inter prediction residual;

(vi) performing a transform in response to said context feature adaptive transform; and (vii) performing coefficient scanning.

11. The apparatus recited in claim 10, wherein said programming for said context adaptive intra prediction is configured for applying a context adaptive intra prediction matrix during intra prediction to generate context adaptive intra prediction results.

12. The apparatus recited in claim 10, wherein said transform comprises a context adaptive transform applied to a prediction residual.

13. The apparatus recited in claim 12, wherein said context adaptive transform is applied to the intra or inter prediction residual.

14. The apparatus recited in claim 10, wherein said scanning comprises a context adaptive scanning of transform coefficients performed with a scanning order selected in response to said context feature.

15. The apparatus recited in claim 14, wherein an optimal scanning order is determined for each context during a training process.

16. The apparatus recited in claim 10, wherein said context feature is at least partially determined in response to accessing a decoded neighboring block for intra coding and decoded motion-compensated neighborhood for inter coding to increase accuracy of directionality and location of discontinuity.

17. An apparatus for performing video coding, comprising:
(a) a computer configured for encoding and/or decoding of video; and
(b) programming executable on said computer for context adaptation by performing steps comprising:
  (i) assuming a block within a video frame is piece-wise smooth;
  (ii) identifying that a discontinuity exists in the block with respect to its context of neighbors;
  (iii) extracting a context feature of said discontinuity having directionality and location of discontinuity within the block, and extracting directionality of said context feature of said discontinuity, by steps including:
    (iii)(1) performing edge detection on neighboring pixels to obtain gradient vectors;
    (iii)(2) removing insignificant gradient samples for smooth sections of an image in response to application of a first threshold comparison and if there is no samples left, considering an area of processing as being smooth and to which the context feature is not applied;
    (iii)(3) performing principle component analysis on gradient vectors for remaining samples to obtain two eigenvalues and two spanning vectors;
    (iii)(4) assuming the spanning vector associated with the smaller eigenvalue as a smooth direction;
    (iii)(5) considering an area of processing as complex and not applying said context feature if the smaller eigenvalue exceeds a first threshold comparison; and
    (iii)(6) utilizing said first direction as the discontinuity direction; and
  (iv) performing coding of said block as a context adaptive operation in response to said context feature.

18. The apparatus recited in claim 17, wherein said context adaptive operation comprises a context adaptive intra prediction in which a context adaptive intra prediction matrix is applied during intra prediction to generate context adaptive intra prediction results.

19. The apparatus recited in claim 17, wherein said context adaptive operation is a context adaptive transform applied to a prediction residual.

20. The apparatus recited in claim 19, wherein said context adaptive transform is applied to the intra or inter prediction residual.

21. The apparatus recited in claim 17, wherein said context adaptive operation is an interpolation filter applied to inter motion-compensated prediction at fractional sub-pels as a context adaptive interpolation filter.

22. The apparatus recited in claim 21, wherein said programming is configured for performing said context adaptive interpolation filter by performing steps comprising:
receiving an incoming bitstream for a block;
determining that the block is an inter-block in response to reading from the bitstream;
obtaining a motion vector (MV) associated with the block from the bitstream;
determining the motion compensated (MC) neighborhood in the reference frame according to the motion vector (MV);
wherein said extracting a context feature of said discontinuity having directionality and location of discontinuity is performed on the motion compensated (MC) neighboring pixels in the reference frame;
determining that directionality and location of discontinuity information is available; and
applying said context adaptive interpolation filter, which is pre-trained and associated with context for sub-pel motion compensated prediction of the block.

23. The apparatus recited in claim 17, wherein said context adaptive operation comprises a context adaptive scanning of transform coefficients which is performed with a scanning order selected in response to said context feature, and a scanning order determined for each context during an off-line training process.

24. The apparatus recited in claim 17, wherein said directionality and location of discontinuity is at least partially determined in response to accessing a decoded neighboring block for intra coding and a decoded motion-compensated neighborhood for inter coding to increase accuracy of the directionality and location of discontinuity.

25. An apparatus for performing video coding, comprising:
(a) a computer configured for encoding and/or decoding of video; and
(b) programming executable on said computer for context adaptation by performing steps comprising:
  (i) assuming a block within a video frame is piece-wise smooth;

(ii) identifying that a discontinuity exists in the block with respect to its context of neighbors;

(iii) extracting a context feature of said discontinuity having directionality and location of discontinuity within the block; and (iv) performing coding of said block as a context adaptive operation in response to said context feature;

(v) wherein said context adaptive operation is an interpolation filter applied to inter motion-compensated prediction at fractional sub-pels as a context adaptive interpolation filter in response to performing steps including:

(v)(1) receiving an incoming bitstream for a block;

(v)(2) determining that the block is an inter-block in response to reading from the bitstream;

(v)(3) obtaining a motion vector (MV) associated with the block from the bitstream;

(v)(4) determining the motion compensated (MC) neighborhood in the reference frame according to the motion vector (MV);

(v)(5) wherein said extracting a context feature of said discontinuity having directionality and location of discontinuity is performed on the motion compensated (MC) neighboring pixels in the reference frame;

(v)(6) determining that directionality and location of discontinuity information is available; and (v)(7) applying said context adaptive interpolation filter, which is pre-trained and associated with context for sub-pel motion compensated prediction of the block.

26. The apparatus recited in claim 25, wherein said context adaptive operation comprises a context adaptive intra prediction in which a context adaptive intra prediction matrix is applied during intra prediction to generate context adaptive intra prediction results.

27. The apparatus recited in claim 25, wherein said context adaptive operation is a context adaptive transform applied to a prediction residual.

28. The apparatus recited in claim 27, wherein said context adaptive transform is applied to the intra or inter prediction residual.

29. The apparatus recited in claim 25, wherein said context adaptive operation comprises a context adaptive scanning of transform coefficients which is performed with a scanning order selected in response to said context feature, and a scanning order determined for each context during an off-line training process.

30. The apparatus recited in claim 25, wherein said directionality and location of discontinuity is at least partially determined in response to accessing a decoded neighboring block for intra coding and a decoded motion-compensated neighborhood for inter coding to increase accuracy of the directionality and location of discontinuity.

31. The apparatus recited in claim 25, wherein said programming is configured for extracting directionality of said context feature of said discontinuity, by performing steps comprising:

performing edge detection on neighboring pixels to obtain gradient vectors;

removing insignificant gradient samples for smooth sections of an image in response to application of a first threshold comparison and if there is no samples left, considering an area of processing as being smooth and to which the context feature is not applied;

performing principle component analysis on gradient vectors for remaining samples to obtain two eigenvalues and two spanning vectors;

assuming the spanning vector associated with the smaller eigenvalue as a smooth direction;

considering an area of processing as complex and not applying said context feature if the smaller eigenvalue exceeds a first threshold comparison; and utilizing said first direction as the discontinuity direction.

* * * * *